United States Patent
Maeng et al.

(10) Patent No.: US 11,322,144 B2
(45) Date of Patent: May 3, 2022

(54) METHOD AND DEVICE FOR PROVIDING INFORMATION

(71) Applicant: LG ELECTRONICS INC., Seoul (KR)

(72) Inventors: Ji Chan Maeng, Seoul (KR); Jong Hoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 193 days.

(21) Appl. No.: 16/730,550

(22) Filed: Dec. 30, 2019

(65) Prior Publication Data

US 2021/0065703 A1    Mar. 4, 2021

(30) Foreign Application Priority Data

Aug. 28, 2019  (KR) .................. 10-2019-0105855

(51) Int. Cl.
| | | |
|---|---|---|
| *G10L 15/22* | (2006.01) | |
| *G10L 13/00* | (2006.01) | |
| *G10L 15/18* | (2013.01) | |
| *G10L 15/08* | (2006.01) | |

(52) U.S. Cl.
CPC .............. *G10L 15/22* (2013.01); *G10L 13/00* (2013.01); *G10L 15/1815* (2013.01); *G10L 2015/086* (2013.01); *G10L 2015/223* (2013.01); *G10L 2015/225* (2013.01)

(58) Field of Classification Search
CPC ......... G10L 15/22; G10L 15/00; G10L 15/24; G10L 13/02; G10L 13/00; G10L 13/027; G10L 13/08
See application file for complete search history.

(56) References Cited

U.S. PATENT DOCUMENTS

| | | | |
|---|---|---|---|
| 9,275,637 B1 | 3/2016 | Salvador et al. | |
| 9,779,732 B2 | 10/2017 | Lee | |
| 10,152,968 B1* | 12/2018 | Agrusa | ............. G10L 15/22 |
| 2021/0065698 A1* | 3/2021 | Topcu | ............. G10L 15/22 |
| 2021/0239831 A1* | 8/2021 | Shin | ............. H04R 1/08 |

\* cited by examiner

*Primary Examiner* — Qi Han
(74) *Attorney, Agent, or Firm* — Birch, Stewart, Kolasch & Birch, LLP

(57) ABSTRACT

Disclosed are an information providing device and an information providing method, which provide information enabling a conversation with a user by executing an artificial intelligence (AI) algorithm and/or a machine learning algorithm in a 5G environment connected for Internet-of-Things. An information providing method according to one embodiment of the present disclosure includes gathering first situational information from a home monitoring device, gathering, from the first electronic device, second situational information corresponding to the first situational information, gathering, from the home monitoring device, third situational information containing a behavioral change of the user after gathering the first situational information, generating a spoken sentence to provide to the user on the basis of the first situational information to the third situational information, and converting the spoken sentence to spoken utterance information to be output to the user.

18 Claims, 8 Drawing Sheets

METHOD AND DEVICE FOR PROVIDING INFORMATION

CROSS-REFERENCE TO RELATED APPLICATION

This present application claims benefit of priority to Korean Patent Application No. 10-2019-0105855, entitled "METHOD AND DEVICE FOR PROVIDING INFORMATION," filed in the Republic of Korea on Aug. 28, 2019, the entirety of which is incorporated herein by reference.

BACKGROUND

1. Technical Field

The present disclosure relates to an information providing method and an information providing device, and more specifically, to an information providing method and an information providing method according to which situational information is gathered based on the behavior of a user using an electronic device, and a spoken sentence generated thereby is converted to spoken utterance information and output for initiating a conversation with the user, and by analyzing feedback spoken utterance information of the user, new spoken utterance information is output, thus enabling a smooth continuation of the conversation with the user.

2. Description of Related Art

Recently, along with technological developments, various services using speech recognition technology have been introduced in many fields. Speech recognition technology is a technology that facilitates interaction between a human user and a machine by allowing the machine to understand speech uttered by the user and provide a service that the user desires.

A speech recognition device using such speech recognition technology initiates speech recognition only when a designated command is inputted. This is to prevent voice command recognition from being constantly activated, thus excessively consuming power and processing resources, and also to prevent the occurrence of speech recognition not intended by the user.

Such a command initiating the speech recognition may be referred to as a wake-up word, and features relevant to wake-up word recognition, since they typically pose a relatively low computational load, may be always running in the background in a speech recognition device. That is, the wake-up word is a word preregistered in a speech recognition device, and when included in spoken utterance information of the user, the speech recognition device recognizes the word to transmit audio signals to an interworking server or perform an assigned action.

U.S. Pat. No. 9,779,732, pertaining to a "Method and electronic device for voice recognition," discloses a technology that recognizes a user's voice signal by using an electronic device and performs a voice recognition operation if the user's voice signal is a previously set keyword (wake-up word). However, since the voice recognition of a machine starts only when the user utters a wake-up word, the technology disclosed in this document fails to enable interaction with the machine even when the user has intended a voice command for the machine, unless the user has uttered a particular wake-up word.

Furthermore, U.S. Pat. No. 9,275,637, pertaining to "wake word evaluation," discloses a technology that receives a plurality of wake word candidate words, and selects therefrom the word with the overall highest score as a wake-up word. The technology disclosed in this document may allow a wake-up word to be more easily selected and used, but is limited in the fact that the wake-up word is necessary in order to communicate with a machine.

The above information disclosed in this Background section is provided only for enhancement of understanding of the background of the present disclosure and therefore it may contain information that does not form prior art that is already known in this country to a person of ordinary skill in the art.

RELATED ART DOCUMENTS

Patent Documents

Related Art 1: U.S. Pat. No. 9,779,732
Related Art 2: U.S. Pat. No. 9,275,637

SUMMARY OF THE INVENTION

One aspect of the present disclosure is to address the shortcoming associated with a situation in which because a speech recognition function of a machine is not possible without being activated by a user using a wake-up word, the user cannot interact with the machine without using the wake-up word, even when the user wants to interact with the machine.

Another aspect of the present disclosure is to naturally initiate a conversation with a user by generating a spoken sentence from situational information gathered based on the user's behavior through a home monitoring device and an electronic device, converting the spoken sentence to spoken utterance information, and outputting the spoken utterance information.

Another aspect of the present disclosure is to naturally initiate a conversation with a user by generating a spoken sentence from situational information gathered based on the user's behavior through a home monitoring device and an electronic device, and weather information gathered at the time of gathering the situational information, converting the spoken sentence to spoken utterance information, and outputting the spoken utterance information.

Another aspect of the present disclosure is to output new spoken utterance information which enables smooth continuation of a conversation with the user by analyzing feedback spoken utterance information of the user corresponding to the output spoken utterance information.

An information providing method of the present disclosure may include generating a spoken sentence by gathering situational information based on the behavior of a user using an electronic device, converting the spoken sentence to spoken utterance information and outputting the same to initiate a conversation with the user, and by analyzing feedback spoken utterance information of the user, outputting new spoken utterance information enabling a smooth continuation of the conversation with the user.

More specifically, the information providing method according to one embodiment of the present disclosure may include gathering first situational information from a home monitoring device, the first situational information containing user manipulation information of a first electronic device manipulated by a user, gathering, from the first electronic device manipulated by the user, second situational information corresponding to the first situational information, the second situational information containing at least one of operation mode information of the first electronic device or operation completion time information of the first electronic device, gathering third situational information containing a behavioral change of the user after the gathering the first situational information from the home monitoring device, generating a spoken sentence to provide to the user on the basis of the first situational information, the second situational information and the third situational information, and converting the spoken sentence to spoken utterance information to output to the user.

The information providing device according to this embodiment may be used to provide an environment that allows the user to more naturally interact with an electronic device through speech, by gathering situational information based on the user's behavior through a home monitoring device and the electronic device, converting a spoken sentence generated thereby to spoken utterance information, and outputting the spoken utterance information.

In addition, the first situational information, the second situational information and the third situational information may be gathered without the home monitoring device receiving any type of wake word from the user, and the generating the spoken sentence and the converting the spoken sentence to the spoken utterance information may be performed without the home monitoring device receiving any type of wake word from the user.

In addition, the generating the spoken sentence may include setting the domain of the spoken sentence to be generated on the basis of the first situational information and the second situational information, loading a glossary associated with the domain of the spoken sentence based on the first situational information, the second situational information and the third situational information, after the third situational information is gathered, extracting and combining terms corresponding to the third situational information from the glossary to generate the spoken sentence.

In addition, the information providing method according to the present embodiment may further include gathering weather information corresponding to the time information associated with occurrences of the first situational information, the second situational information and the third situational information, and the generating the spoken sentence may include, extracting and combining terms corresponding to the third situational information and the weather information from the glossary to generate the spoken sentence after the third situational information is gathered.

In addition, in the information providing method according to the present embodiment, the third situational information may contain information associated with a situation in which the user relocating from a space including the first electronic device to a space including a second electronic device capable of audio output; analyzing the first situational information and the second situational information to generate the spoken sentence to be output from the second electronic device, the deep neural network being previously trained to generate the spoken sentence by analyzing manipulation information of the user manipulating the first electronic device, and the operation mode and operation completion time information of the first electronic device; and the converting the spoken sentence to the spoken utterance information to be output may include transmitting the spoken utterance information to the second electronic device.

In addition, in the information providing method according to an embodiment of the present disclosure, the spoken sentence may contain at least one of operation mode information, operation state information, or operation completion time information of the first electronic device, and the generating the spoken sentence may include generating a spoken suggestion sentence suggesting selecting a function of outputting alarm information when the first electronic device reaches an operation completion time.

In addition, the generating the spoken sentence may include generating a spoken suggestion sentence suggesting setting an operation mode of another electronic device interworking with the first electronic device.

In addition, the information providing method according to the present embodiment may further include, after the converting the spoken sentence to the spoken utterance information to output, verifying a quality of the spoken sentence by monitoring reaction information of the user corresponding to the output spoken utterance information.

In addition, verifying the quality of the spoken sentence may include verifying the quality of the spoken sentence by monitoring the reaction information of the user from at least one of image information of the user or speech information of the user, in which after outputting the spoken utterance information, the image information is obtained using a camera provided in the home monitoring device within a predetermined time, and the audio information is obtained using a microphone provided in the home monitoring device within the predetermined time.

In addition, the information providing method according to the present embodiment may further include: after outputting the spoken utterance information, receiving feedback spoken utterance information of the user; performing speech recognition with respect to the feedback spoken utterance information; and outputting new spoken utterance information corresponding to a result of performing the speech recognition, the performing the speech recognition with respect to the feedback spoken utterance information may include: generating a feedback text item produced by converting the feedback spoken utterance information to text; learning an utterance intention of the feedback spoken utterance information by performing syntactic analysis or semantic analysis on the feedback text item; generating a response text item based on a knowledge base corresponding to the utterance intention; and converting the response text item to the new spoken utterance information in a form of natural language speech.

An information providing device according to another embodiment of the present disclosure may include a first acquirer configured to gather first situational information from a home monitoring device, the first situational information containing user manipulation information of a first electronic device manipulated by a user, a second acquirer configured to gather, from the first electronic device, second situational information corresponding to the first situational information, the second situational information containing at least one of operation mode information of the first electronic device or operation completion time information of the first electronic device, a third acquirer configured to gather third situational information containing a behavioral change of the user after gathering the first situational information from the home monitoring device, a generator configured to generate a spoken sentence to provide to the user on the basis of the first situational information, second situational information and the third situational information, and a converter configured to convert the spoken sentence to spoken utterance information to output to the user.

The information providing device according to this embodiment may be used to provide an environment that allows the user to more naturally interact with an electronic device through speech, by gathering situational information based on the user's behavior through a home monitoring device and the electronic device, and converting a spoken sentence generated thereby to spoken utterance information to be output.

In addition, the first situational information, the second situational information and the third situational information may be gathered without the home monitoring device receiving any type of wake word from the user, and the spoken sentence is generated by the generator and the spoken sentence may be converted to the spoken utterance information by the convertor without the home monitoring device receiving any type of wake word from the user.

In addition, the generator may include a setter configured to set the domain of a spoken sentence to be generated on the basis of the first situation information and the second situation information, a loader configured to load a glossary associated with the domain of the spoken sentence to be generated on the basis of the first situation information and the second situation information, and a spoken sentence generator configured to generate, after the third situation information is gathered, the spoken sentence by extracting and combining terms corresponding to the third situational information from the glossary.

In addition, the information providing device according to this embodiment may further include a fourth acquirer configured to gather weather information corresponding to the time information associated with occurrences of the first situation information the second situational information and the third situation information, and the spoken sentence generator may be configured, once the third situation information is gathered, by extracting and combining the terms corresponding to the third situational information and the weather information from the glossary.

In addition, in the information providing device according to an embodiment of the present disclosure, the third situational information may contain information associated with the user relocating from a space including the first electronic device to a space including a second electronic device capable of audio output; the generator may be configured to generate the spoken sentence to be output to the second electronic device by analyzing the first situational information and the second situational information by using a deep neural network model, the deep neural network model being previously trained to generate the spoken sentence by analyzing manipulation information of the user manipulating the first electronic device, and operation mode and operation completion time information of the first electronic device; and the information providing device may further include a communicator configured to transmit the spoken utterance information to the second electronic device.

In addition, in the information providing device according to this embodiment of the present disclosure, the spoken sentence may contain at least one of operation mode information, operation state information, or operation completion time information of the first electronic device, and the generator may further include a processor configured to generate a spoken suggestion sentence suggesting selecting a function of outputting alarm information when the first electronic device reaches an operation completion time.

In addition, the generator may further include a processor configured to generate a spoken suggestion sentence suggesting setting an operation mode of another electronic device interworking with the first electronic device.

In addition, the information providing device according to an embodiment of the present disclosure may further include a verifier configured to, after converting the spoken sentence to the spoken utterance information, verify a quality of the spoken sentence by monitoring reaction information of the user corresponding to the output spoken utterance information.

In addition, the verifier may be configured to verify the quality of the spoken sentence by monitoring the reaction information of the user from at least one of image information of the user or audio information of the user, in which the image information is obtained using a camera provided in the home monitoring device within a predetermined time, and the audio information is obtained using a microphone provided in the home monitoring device within the predetermined time, after outputting the spoken utterance information.

In addition, the information providing device according to this embodiment of the present disclosure may further include a speech recognizer configured to receive feedback spoken utterance information of the user after outputting the spoken utterance information, perform speech recognition with respect to the feedback spoken utterance information, and output new spoken utterance information corresponding to a result of performing the speech recognition, the speech recognizer may be configured to generate a feedback text item produced by converting the feedback spoken utterance information to text, learn an utterance intention of the feedback spoken utterance information by performing syntactic analysis or semantic analysis on the feedback text item, generate a response text item based on a knowledge base corresponding to the utterance intention, and convert the response text item to the new spoken utterance information in the form of natural language speech to be output.

In addition, other methods and other systems for implementing the present disclosure, and a computer-readable medium for storing a computer program for executing the above method may be further provided.

Other aspects, features, and advantages other than those described above will become apparent from the following drawings, claims, and detailed description of the present disclosure.

According to the present disclosure, by allowing a machine to appropriately determine to activate a speech recognition function when a user wants to interact with the machine through speech, without using a wake-up word, an environment in which the user can more naturally interact with the machine can be provided.

In addition, by generating a spoken sentence from situational information based on the user's behavior gathered through a home monitoring device and an electronic device, converting the spoken sentence to spoken utterance information, and outputting the spoken utterance information, an environment in which the user can more naturally interact with an electronic device through speech can be provided.

In addition, by generating a spoken sentence from situational information based on the user's behavior gathered through a home monitoring device and an electronic device, and weather information gathered at the time of gathering the situational information, converting the spoken sentence to spoken utterance information, and outputting the spoken utterance information, an environment in which the user can more naturally interact with an electronic device through speech can be provided.

In addition, by analyzing the feedback spoken utterance information of the user corresponding to the output spoken utterance information, a speech recognition service thus provided is capable of smoothly sustaining a conversation with the user, thus eliminating any reluctance to use the speech recognition service by the user and improving the use efficiency.

The effects of the present disclosure are not limited to the effects mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE EMBODIMENTS

Figure 1:
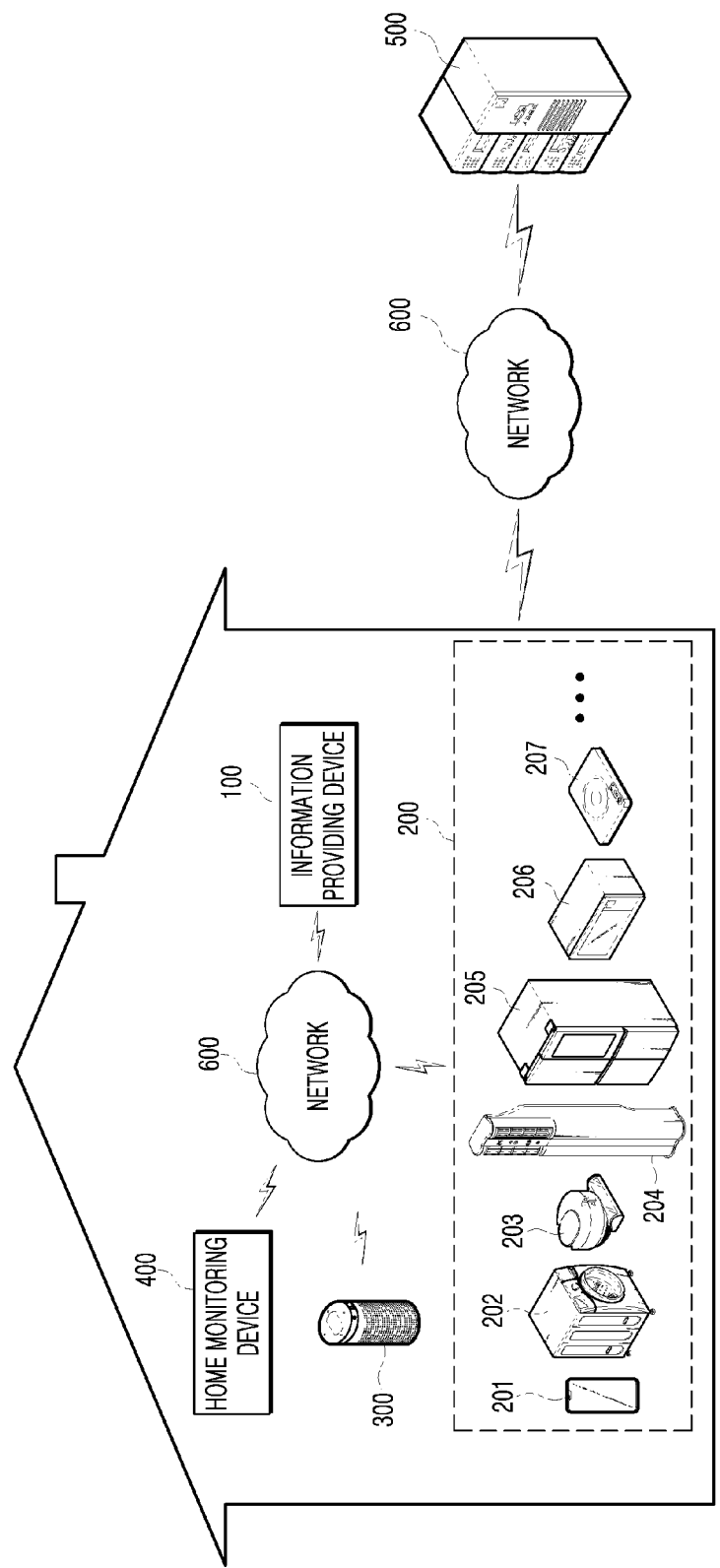
FIG. 1 is a diagram illustrating an example of an information providing environment according to an embodiment of the present disclosure, including an information providing device, an electronic device, a home monitoring device, a server, and a network connecting the information providing device, the electronic device, the home monitoring device, and the server to one another.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is a diagram illustrating an example of an information providing environment according to an embodiment of the present disclosure, including an information providing device, an electronic device, a home monitoring device, a server, and a network connecting the information providing device, the electronic device, the home monitoring device, and the server to one another. Referring to FIG. 1, the information providing environment may include an information providing device 100, a first electronic device 200, a second electronic device 300, a home monitoring device 400, a server 500, and a network 600.

The information providing device 100 may generate a spoken sentence for initiating a conversation with a user, convert the spoken sentence to spoken utterance information to output, recognize feedback spoken utterance information of the user, and output new spoken utterance information to continue the conversation with the user. The information providing device 100 may perform generation of the spoken sentence and conversion of the same to the spoken utterance information, and for outputting the new spoken utterance information, may gather first situational information to third situational information from the first electronic device 200 and the home monitoring device 400

Here, the first situational information is information gathered from the home monitoring device 400, and may contain information related to a user's manipulation of the first electronic device 200. The home monitoring device 400 may monitor the behavior of the user through a camera (421 in FIG. 5) located in an indoor space, and when the user approaches a space in which the first electronic device 200 is disposed, that is, when the distance between the user and the first electronic device 200 becomes less than a predetermined distance (for example, one meter), may generate first user event information. Through the first user event information, the possibility of the user operating the first electronic device 200 may be predicted.

When the first user event information is generated, the home monitoring device 400 may generate the first situational information by monitoring, through the camera (421 in FIG. 5), an image of the user manipulating the first electronic device 200. The first situational information, through analysis of the image of the user manipulating the first electronic device 200, may contain information related to the type of the first electronic device 200 that the user is manipulating, what manipulation the user is performing with respect to the first electronic device 200, and the time at which the first electronic device 200 is being manipulated.

For example, in a situation in which the user is manipulating a washing machine 202, the home monitoring device 400 may generate the first user event information when the distance between the user and the washing machine 202 becomes less than a predetermined distance (for example, one meter), and may generate the first situational information by monitoring, through the camera (421 in FIG. 5), an image of the user manipulating the washing machine 202. Here, the first situational information may contain information related to the type of the first electronic device 200 that the user is manipulating is the washing machine 202, what manipulation the user is performing on the washing machine 202 (for example, putting in clothes to be washed and pressing a wash button), and time information (for example, seven PM) of the washing machine 202 being manipulated.

The information providing device 100 may gather the first situational information from the home monitoring device 400. Here, when the first user event information is generated, the home monitoring device 400 may generate the first situational information and transmit the same to the information providing device 100, thereby allowing the information providing device 100 to gather the first situational information. In some embodiments, by periodical requests from the information providing device 100, the home monitoring device 400 may transmit the first situational information stored therein to the information providing device 100, thereby allowing the information providing device 100 to gather the first situational information.

In addition, the second situational information is information gathered from the first electronic device 200, and the information providing device 100, which has gathered the first situational information, may request the first electronic device 200 for the second situational information and gather the same from the first electronic device 200. The second situational information is information generated by a user's manipulation signal which the first electronic device 200 has received, and may contain at least one of operation mode information or operation completion time information of the first electronic device 200. The information providing device 100, having gathered the second situational information, may use time information of manipulating the first electronic device 200 contained in the first situational information, and the operation completion time information of the first electronic device 200, to calculate end time information at which the first electronic device 200 finishes an operation, and may include the end time information for the first electronic device 200 finishing the operation in the second situational information.

For example, having gathered the first situational information with respect to a manipulation of the washing machine 202 from the home monitoring device 400, the information providing device 100 may request the washing machine 202 for the second situational information containing at least one of operation mode (for example, washing and spinning) information or operation completion time information (for example, fifty minutes) of the washing machine 202, and receive the same from the washing machine 202. Having gathered the second situational information, the information providing device 100 may use the time for manipulating the washing machine 202 (for example, 7 PM) and an operation completion time information (for example, fifty minutes) of the washing machine 202 to calculate an end time (for example, 7:50 PM) at which the washing machine 202 finishes an operation, and may include the end time (for example, 7:50 PM) at which the washing machine 202 finishes the operation into the second situational information.

After having gathered the first situational information from the home monitoring device 400, the information providing device 100 may request the first electronic device 200 for transmission of the second situational information, and may gather the second situational information from the first electronic device 200.

In addition, the third situational information is information gathered from the home monitoring device 400, and may contain a behavioral change of the user after gathering the first situational information.

The home monitoring device 400 may monitor the user's behavior through a camera (421 in FIG. 5) located in an indoor space, and may generate first user event information when the user relocates from a space in which the first electronic device 200 is disposed to a space in which the second electronic device 300 is disposed, that is, when the distance between the user and the first electronic device 200 exceeds a predetermined distance (for example, one meter). Through second user event information, it is possible to predict the user's relocating to the space in which the second electronic device 300 is disposed after manipulating the first electronic device 200.

When the second user event information occurs, the home monitoring device 400 may generate the third situational information by monitoring, through the camera (421 in FIG. 5), an image of the user relocating. Through analyzing the image of the user relocating, the third situational information may contain information associated with the direction in which the user is moving, the presence of another camera capable of monitoring the behavior of the user in the direction in which the user is moving, and time information for when the user exceeds a predetermined distance from the first electronic device 200.

For example, in a situation where the user has manipulated the washing machine 202 and relocated to a living room where the second electronic device 300 is located, the home monitoring device 400 may generate the second user event information when the distance between the user and the washing machine 202 exceeds a predetermined distance (for example, one meter), and may generate the third situational information by monitoring, through the camera (421 in FIG. 5), an image of the user relocating. Here, the third situational information may contain information associated with the direction in which the user is moving (for example, to the living room to the north-east of the washing machine 202), the presence of another camera capable of monitoring the behavior of the user in the direction in which the user is moving (for example, whether another camera is present in the living room), and time information for when the user exceeds a predetermined distance from the first electronic device 200 (for example, 7:02 PM).

The information providing device 100 may gather the third situational information from the home monitoring device 400. Here, when the first user event information is generated, the home monitoring device 400 may generate the third situational information and transmit the same to the information providing device 100, thereby allowing the information providing device 100 to gather the third situational information. In some embodiments, by periodical requests from the information providing device 100, the home monitoring device 400 may transmit the third situational information stored therein to the information providing device 100, thereby allowing the information providing device 100 to gather the third situational information.

In some embodiments, the information providing device 100 may request a weather information providing device providing weather information for weather information corresponding to time information associated with occurrences of the first event information to the third event information, and gather the same from the weather information providing device.

After having gathered the first situational information to the third situational information and the weather information from the first electronic device 200 and the home monitoring device 400, the information providing device 100 may generate a spoken sentence to provide to the user on the basis of the first situational information to the third situational information, and may convert the spoken sentence to spoken utterance information and output the spoken utterance information for the purpose of initiating a conversation with the user. In some embodiments, the information providing device 100 may transmit the spoken utterance information to the second electronic device 300, thereby allowing the second electronic device 300 to output the spoken utterance information.

In the present embodiment, even when the user has not uttered a wake-up word, the information providing device 100 may understand when the user wants to interact with the information providing device 100 through speech from the first situational information to the third situational information, and the information providing device 100 may activate the speech recognition function to start a conversation with the user and recognize feedback spoken utterance information of the user to generate spoken utterance information.

By using a deep neural network model previously trained to generate the spoken sentence by analyzing manipulation information of the user manipulating the first electronic device 200, and operation mode and operation completion time information of the first electronic device 200, the first situational information and the second situational information may be analyzed to generate a spoken sentence to be output from the second electronic device 300.

After converting the spoken sentence to the spoken utterance information, the information providing device 100 may verify the quality of the spoken sentence by monitoring reaction information of the user corresponding to the output spoken utterance information.

After outputting the spoken utterance information, the information providing device 100 may receive feedback spoken utterance information of the user, perform speech recognition with respect to the feedback spoken utterance information, and output new spoken utterance information corresponding to a result of performing the speech recognition, thereby enabling smooth continuation of the conversation with the user.

The first electronic device 200 may include various Internet of Things (IoT) devices, such as the user terminal 201, the washing machine 202, a robot cleaner 203, an air conditioner 204, a refrigerator 205, a microwave 206, and an induction range 207. However, the examples of the first electronic device 200 are not limited to what are described in FIG. 1. In the present embodiment, the first electronic device 200 may generate the second situational information described above in response to a request to provide information from the information providing device 100, and transmit the second situational information to the information providing device 100.

Furthermore, in the present embodiment, the user terminal 201 may also receive a service for operating or controlling the information providing device 100 through an authentication process after accessing an information providing device operating application or information providing device operating site. In the present embodiment, the user terminal 201 that has completed an authentication process may operate the information providing device 100 and control the operation of the information providing device 100.

In this embodiment, the user terminal 201 may be desktop computer, smart phone, notebook, tablet PC, smart TV, mobile phone, personal digital assistant (PDA), laptop, media player, micro-server, global positioning system (GPS) device, electronic book terminal, digital broadcasting terminal, navigation, kiosk, MP4 player, digital camera, home appliances and other mobile or non-mobile computing devices which are operated by an user, but is not limited thereto. In addition, the user terminal 201 may be a wearable terminal such as a watch, glasses, a hair band, and a ring having a communication function and a data processing function. However, the user terminal 201 is not limited thereto, and any terminal that is capable of performing web browsing may be used without limitation.

The second electronic device 300 may include an artificial intelligence speaker which acts as a hub connecting the first electronic device 200 to the network 600. In the present embodiment, the second electronic device 300 may receive spoken utterance information from the information providing device 100 and output the same.

The home monitoring device 400 may be provided with a camera (421 in FIG. 5) in an indoor space inside a house that requires surveillance, and transmit the image photographed by the camera 421 to a receiving device (for example, a personal computer, the information providing device 100, or the first electronic device 200) to enable a remote surveillance at a short distance. In the present embodiment, the home monitoring device 400 may analyze the image of the user photographed by the camera 421 to generate user event information, and may generate the first situational information and the third situational information and transmit the same to the information providing device 100.

In addition, the home monitoring device 400 may generate reaction information of the user from at least one of image information of the user obtained using the camera (421 in FIG. 5) within a predetermined time, and/or audio information of the user obtained using a microphone (422 in FIG. 5) obtained within a predetermined time after the information providing device 100 outputs the spoken utterance information toward the user, and transfer the reaction information of the user to the information providing device 100. The detailed operation of the home monitoring device 400 will be described with reference to FIG. 5.

The server 500 may be a database server which provides big data required for applications of various artificial intelligence algorithms, and data for operating the information providing device 100. Furthermore, the server 500 may include a web server or application server which enables remote control of the information providing device 100 by using an information providing device-operating application or an information providing device-operating web browser installed on the user terminal 201.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

The server 500 may receive the first situational information to the third situational information from the information providing device 100, generate a spoken sentence to provide to the user on the basis of the first situational information to the third situational information, and transmit the spoken sentence to the information providing device 100. The server 500 may use a deep neural network model previously trained to generate the spoken sentence by analyzing user's manipulation information manipulating the first electronic device 200, and operation mode and operation completion time information of the first electronic device 200, to analyze the first situational information and the second situational information to generate the spoken sentence to be output from the second electronic device 300. In addition, after outputting the spoken utterance information, the server 500 may receive feedback spoken utterance information of the user, perform speech recognition with respect to the feedback spoken utterance information of the user, and transmit new spoken utterance information corresponding to a result of performing the speech recognition to the information providing device 100.

The network 600 may serve to connect the information providing device 100, the first electronic device 200, the home monitoring device 400, and the server 500 to one another. Such a network 600 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 600 may also send and receive information using short distance communication and/or long distance communication. The short distance communication may include Bluetooth®, radio frequency identification (RFID), Infrared Data Association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 600 may include a connection of network elements such as hubs, bridges, routers, switches, and gateways. The network 600 may include one or more connected networks, for example, a multi-network environment, including a public network such as the Internet and a private network such as a secure corporate private network. Access to the network 600 may be provided via one or more wired or wireless access networks. Further, the network 600 may support 5G communication and/or an Internet of things (IoT) network for exchanging and processing information between distributed components such as objects.

Figure 2:
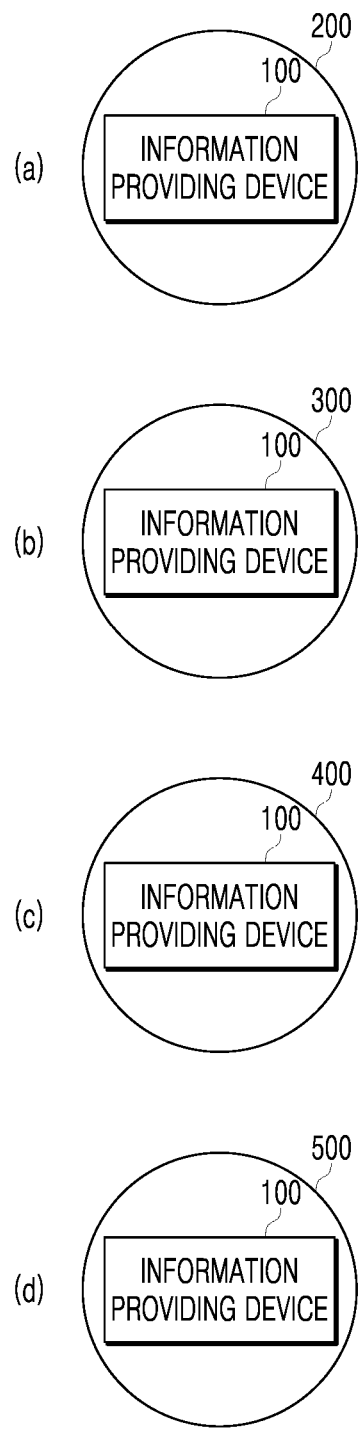
FIG. 2 is a diagram illustrating an example of an information providing environment illustrating another embodiment of an information providing device according to the present disclosure.
Figure 3:
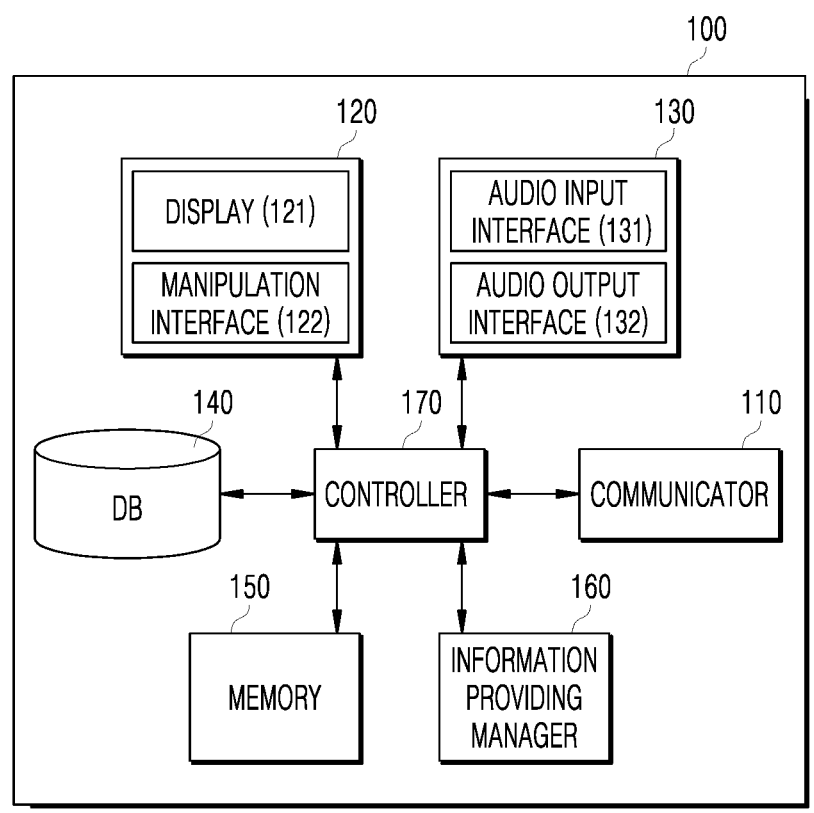
FIG. 3 is a diagram schematically illustrating the detailed configuration of an information providing device according to an embodiment of the present disclosure.

FIG. 2 is a diagram illustrating an example of an information providing environment illustrating another embodiment of an information providing device according to the present disclosure. In the following description, description of parts overlapping with those of FIG. 1 will be omitted.

Referring to FIG. 2A and FIG. 2B, the information providing device 100 may be included in one of the first electronic device 200, the second electronic device 300, the home monitoring device 400, or the server 500. Various methods may be employed to include the information providing device 100 in one of the first electronic device 200, the second electronic device 300, the home monitoring device 400, and the server 500. As a specific embodiment, the information providing device 100 may be installed on one of the first electronic device 200, the second electronic device 300, the home monitoring device 400, or the server 500, through the network 600. For example, the information providing device 100 may be installed on one of the first electronic device 200, the second electronic device 300, the home monitoring device 400, or the server 500, as a single application. As another specific embodiment, the information providing device 100 may be installed on one of the first electronic device 200, the second electronic device 300, the home monitoring device 400, or the server 500, through off-line. However, the present disclosure is not limited to the above-described embodiments, but may include a situation in which the information providing device 100 is installed on one of the first electronic device 200, the home monitoring device 400, or the server 500 in various forms.

Figure 4:
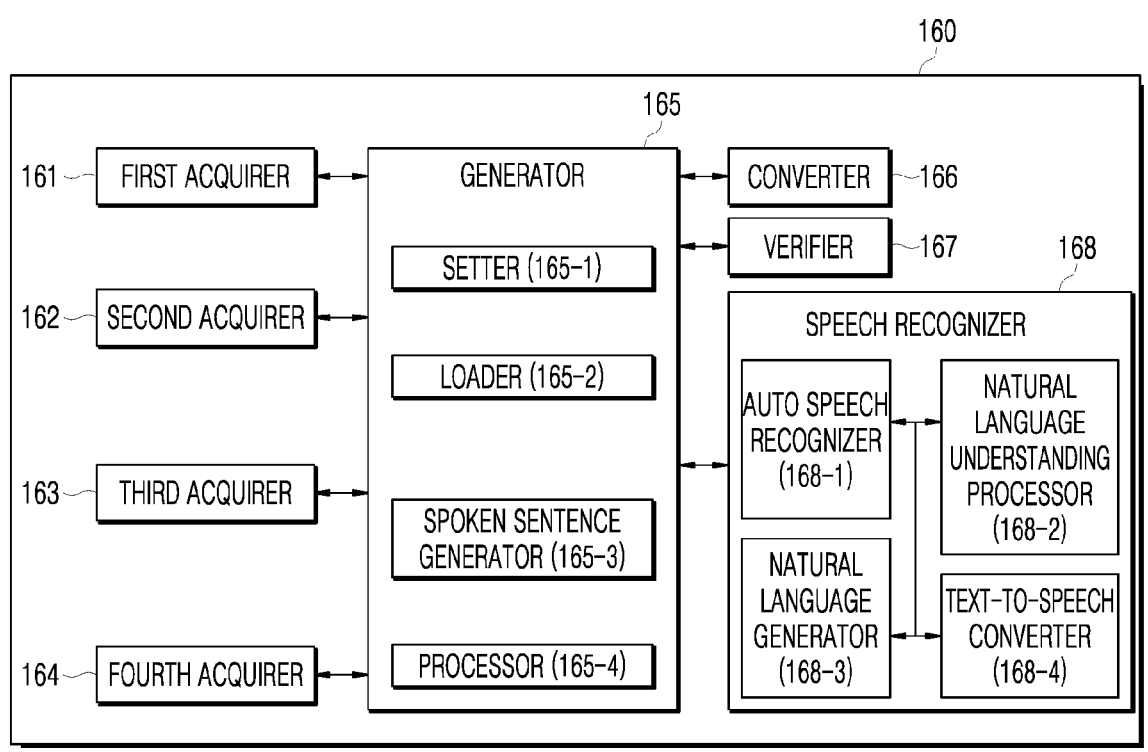
FIG. 4 is a diagram schematically illustrating the detailed configuration of an information providing manager of the information providing device in FIG. 3, according to an embodiment of the present disclosure.

FIG. 4 is a diagram schematically illustrating the detailed configuration of an information providing device according to an embodiment of the present disclosure. In the following description, description of parts that are the same as those in FIG. 1 and FIG. 2 will be omitted. Referring to FIG. 4, the information providing device 100 may include a user interface 120 including a communicator 110, a display 121, and a manipulation interface 122; an audio processor 130 including an audio input interface 131, and an audio output interface 132; a database 140; a memory 150; an information providing manager 160; and a controller 170.

The communicator 110 may interwork with the network 600 to provide a communication interface required to provide transmission/reception signals between the information providing device 100, the first electronic device 200, the second electronic device 300, the home monitoring device 400, and/or the server 500, in the form of packet data. Furthermore, the communicator 110 may receive a predetermined information request signal from the first electronic device 200, the second electronic device 300, and/or the home monitoring device 400, and may transmit the information that the information providing device 100 has processed to the first electronic device 200, the second electronic device 300, and/or the home monitoring device 400. In addition, the communicator 110 may transmit a predetermined information request signal from the first electronic device 200, the second electronic device 300, and/or the home monitoring device 400, to the server 500, and may receive a response signal that the server 500 has processed, and transmit the same to the first electronic device 200, the second electronic device 300, and/or the home monitoring device 400. Furthermore, the communicator 110 may be a device including hardware and software required for transmitting and receiving signals such as a control signal and data signals via a wired or wireless connection to another network device.

Furthermore, the communicator 110 may support a variety of object-to-object intelligent communication, such as Internet of things (IoT), Internet of everything (IoE), and Internet of small things (IoST), and may support, for example, machine to machine (M2M) communication, vehicle to everything (V2X) communication, and device to device (D2D) communication. In the present embodiment, the communicator 110 may transmit the spoken utterance information to the second electronic device 300.

The display 121 in the user interface 120 may display an operating state of the information providing device 100 under control of the controller 170. According to an embodiment, the display 121 may be configured as a touch screen by forming a mutual layer with a touch pad. In this situation, the display 121 may also be used as the manipulation interface 122 capable of inputting information in response to a touch of a user. To this end, the display 121 may be configured with a touch-sensitive display controller or other various input and output controllers. As an example, the touch recognition display controller may provide an output interface and an input interface between the device and the user. The touch-sensitive display controller may transmit and receive electric signals to and from the controller 170. Also, the touch recognition display controller may display a visual output to the user, and the visual output may include text, graphics, images, video, and a combination thereof. The display 121 may be a predetermined display member such as, for example, a touch-sensitive organic light emitting display (OLED), liquid crystal display (LCD), or light emitting display (LED).

The manipulation interface 122 of the user interface 120 may have a plurality of buttons, and signals corresponding to inputted buttons may be transmitted to the controller 170. The manipulation interface 122 may be configured with a sensor, buttons, or a switch structure capable of recognizing a touch or pressing operation of the user. In the present example, the manipulation interface 122 may transmit, to the controller 170, a manipulation signal corresponding to a manipulation of the user in order to confirm or modify various information regarding the operation of the information providing device 100 displayed on the display 121.

In the present embodiment, when the information providing device 100 is included in the first electronic device 200, the second electronic device 300, and/or the home monitoring device 400, the user interface 120 may be replaced with a display and a manipulation interface of the first electronic device 200, the second electronic device 300, and/or the home monitoring device 400.

The audio input interface 131 of the audio processor 130 may receive, from the user, feedback spoken utterance information or/and audio reaction information of the user, and transmit the same to the controller 170, and the controller 170 may transmit the feedback spoken utterance information of the user to the information providing manager 160 to perform speech recognition processing. The controller 170 may transmit the audio reaction information of the user to the information providing manager 160 to verify the quality of the spoken sentence. To this end, the audio input interface 131 may be provided with at least one microphone. In addition, there may be provided a plurality of microphones 422 for more accurately receiving the feedback spoken utterance information of the user and/or the audio reaction information of the user. Here, the plurality of microphones may be disposed in different locations, spaced apart from each other, and may process the received feedback spoken utterance information of the user and/or the audio reaction information of the user into electric signals.

In some embodiments, the audio input interface 131 may use various noise removal algorithms in order to remove noise generated in the process of receiving feedback spoken utterance information of the user and/or audio reaction information of the user. In some embodiments, the audio input interface 131 may include various components for processing signals of feedback spoken utterance information of the user and/or audio reaction information of the user, such as a filter for removing noise generated when receiving the feedback spoken utterance information of the user and/or audio reaction information of the user, and an amplifier for amplifying signals from the filter and outputting the same.

Under control of the controller 170, the audio output interface 132 in the audio processor 130 may output, for example, an alarm sound, notification messages regarding an operation mode, an operation state, and an error state, and processing results corresponding to information corresponding to a voice command contained in feedback spoken utterance information of the user, as audio. In the present embodiment, the audio output interface 132 may output spoken utterance information produced by converting to speech a spoken sentence generated by the information providing manager 160 to provide to the user, and new spoken utterance information corresponding to a speech recognition result with respect to the feedback spoken utterance information of the user. The audio output interface 132 may convert electric signals from the controller 170 into audio signals, and output the same. To this end, the audio output interface may be provided with, for example, a speaker.

In the present embodiment, the information providing device 100, when included in the first electronic device 200, the second electronic device 300, and/or the home monitoring device 400, may be replaced with an audio input interface and an audio output interface of the first electronic device 200, the second electronic device 300, and/or the home monitoring device 400.

The database 140 may include a management database which stores information that the information providing device 100 has gathered and generated. Here, the management database may store therein information such as the second situational information gathered from the first electronic device 200, the first situational information and the third situational information gathered from the home monitoring device 400, history information regarding the spoken utterance provided to the user and spoken utterance information, feedback spoken utterance information received from the user, history information of new spoken utterance information provided to the user, information on interworking with other home appliances, and a glossary for generating a spoken sentence.

The database 140 may further include a user database for storing user information. Here, the user database may store therein information of a user to receive a spoken utterance service from the information providing device 100. Here, the user information may include: basic information on a user, such as name, affiliation, personal data, gender, age, contact information, email, and address; authentication (login) information such as an ID (or email) and a password; and access-related information such as an access country, an access location, information about a device used for access, and an accessed network environment.

The memory 150 may include a volatile or non-volatile recording medium for loading and storing various information required for the operation of the information providing device 100, such as manipulation information of a user manipulating the first electronic device 200, a deep neural network model for generating a spoken sentence to be output from the second electronic device 300 by analyzing operation mode and operation completion time information of the first electronic device 200, a domain of the spoken sentence set for generating the spoken sentence in some embodiments, and information on a glossary associated with the domain of the spoken sentence. Furthermore, the memory 150 may store control software for operating the information providing device 100.

Here, the memory 150 may include magnetic storage media or flash storage media, but the scope of the present disclosure is not limited thereto. The memory 170 as described above may include magnetic storage media or flash storage media, but the scope of the present disclosure is not limited thereto. This memory 150 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

For example, the information providing device 100 may perform relatively simple speech recognition while the server 500 performs relatively more advanced speech recognition such as natural language processing. For example, when gathering the first situational information to the third situational information from the first electronic device 200 and the home monitoring device 400, the information providing device 100 may have a speech recognition function activated and convert to a state for receiving feedback spoken utterance information of the user. Given that the system resources of the information providing device 100 are limited, complex natural language recognition and processing may be performed through the server 500.

Upon gathering the first situational information to the third situational information and the weather information from the first electronic device 200 and the home monitoring device 400, the information providing manager 160 may generate a spoken sentence to provide to the user on the basis of the first situational information to the third situational information, and may convert the spoken sentence to spoken utterance information and output the same for the purpose of initiating a conversation with the user.

After converting the spoken sentence to the spoken utterance information, the information providing manager 160 may verify the quality of the spoken sentence by monitoring reaction information of the user corresponding to the output spoken utterance information.

After outputting the spoken utterance information, the information providing manager 160 may receive feedback spoken utterance information of the user, perform speech recognition with respect to the feedback spoken utterance information, and output new spoken utterance information corresponding to a result of performing the speech recognition, thereby enabling smooth continuation of the conversation with the user.

In the present embodiment, the information providing manager 160 may perform learning in connection with the controller 170, or may receive learning results from the controller 170. In the present embodiment, the information providing manager 160 may be provided outside the controller 170 as illustrated in FIG. 4, or may be provided inside the controller 170 and operate like the controller 170, or may be provided within the server 500 of FIG. 1. Next, the information providing manager 160 will be described in greater detail with reference to FIG. 4.

The controller 170 may control the entire operation of the information providing device 100 by operating control software installed in the memory 150 as a kind of central processing device. The controller 170 may include any type of device capable of processing data, such as a processor. Here, 'the processor' may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

In the present embodiment, the controller 170 may perform machine learning, such as deep learning, with respect to the gathered first situational information to third situational information, and weather information, to cause the information providing device 100 to generate an optimal spoken sentence, output spoken utterance information, and recognize feedback spoken utterance to output optimal new spoken utterance information, and the memory 150 may store therein data such as data to be used in machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may be configured as a deep neural network (DNN) such as a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) to produce a desired output from a given input. Also, the artificial neural network can continuously update the weight values through learning. Furthermore, methods such as back propagation may be used in training the artificial neural network.

As described above, the controller 170 may be provided with an artificial neural network and perform machine learning-based user recognition and user's speech recognition using received audio signals as input data.

The controller 170 may include an artificial neural network, for example, a deep neural network (DNN) such as a CNN, an RNN, and a DBN, and may train the DNN. As a machine learning method for such an artificial neural network, both unsupervised learning and supervised learning may be used. The controller 170 may control to have a tone artificial neural network structure to be updated after learning.

FIG. 4 is a diagram illustrating the detailed configuration of the information providing manager of the information providing device in FIG. 4. Hereinbelow, description of the common parts previously described with reference to FIG. 1 to FIG. 4 will be omitted. Referring to FIG. 4, the information providing manager 160 may include a first acquirer 161 to a fourth acquirer 164, a generator 165, a converter 166, a verifier 167, and a speech recognizer 168.

The first acquirer 161 may gather the first situational information from the home monitoring device 400. Here, the first situational information is information of the user manipulating the first electronic device 200, and may contain information related to the type of the first electronic device 200 that the user is manipulating, what manipulation the user is performing with respect to the first electronic device 200, and the time of the manipulation of the first electronic device 200.

The second acquirer 162 may gather, from the first electronic device 200, the second situational information corresponding to the acquisition of the first situational information. After gathering the first situational information, the second acquirer 162 may request the first electronic device 200 for transmission of the second situational information, and may gather the second situational information from the first electronic device 200. Here, the second situational information is information generated by a user's manipulation signal which the first electronic device 200 has received, and may contain at least one of operation mode information and operation completion time information of the first electronic device 200. The second acquirer 162, having gathered the second situational information, may use time information of the manipulation of the first electronic device 200 contained in the first situational information, and the operation completion time information of the first electronic device 200, to calculate end time information at which the first electronic device 200 finishes an operation, and may include the end time information at which the first electronic device 200 finishes the operation in the second situational information.

The third acquirer 163 may gather third situational information from 400 after gathering the first situational information. Here, the third situational information is information containing a behavioral change of the user after gathering the first situational information, and may contain information associated with a situation in which the user relocates from a space in which the first electronic device 200 is disposed to a space in which the second electronic device 300 is disposed. The third situational information may contain information associated with the direction in which the user is moving, the presence of another camera capable of monitoring the behavior of the user in the direction in which the user is moving, and time information for when the user exceeds a predetermined distance (for example, one meter) from the first electronic device 200.

The fourth acquirer 164 may request a weather information providing device providing weather information for weather information corresponding to time information for occurrences of the first event information to the third event information, and gather the weather information.

The generator 165 may generate a spoken sentence to provide to the user on the basis of the first situational information to the third situational information, and the weather information. Even when the user has not uttered a wake-up word, the generator 165 may understand when the user wants to interact with the information providing device 100 through speech from the first situational information to the third situational information, and may activate the speech recognition function to start a conversation with the user, and may recognize feedback spoken utterance information of the user to generate spoken utterance information. Here, the speech recognition function may include activating the functions of a converter 166 and/or the speech recognizer 168.

By using a deep neural network model previously trained to generate the spoken sentence by analyzing operation information of a user manipulating the first electronic device 200, and operation mode and operation completion time information of the first electronic device 200, the generator 165 may analyze the first situational information and the second situational information to generate a spoken sentence to be output from the second electronic device.

In the present embodiment, the generator 165 may include a setter 165-1, a loader 165-2, a spoken sentence generator 165-3, and a processor 165-4.

Figure 6:
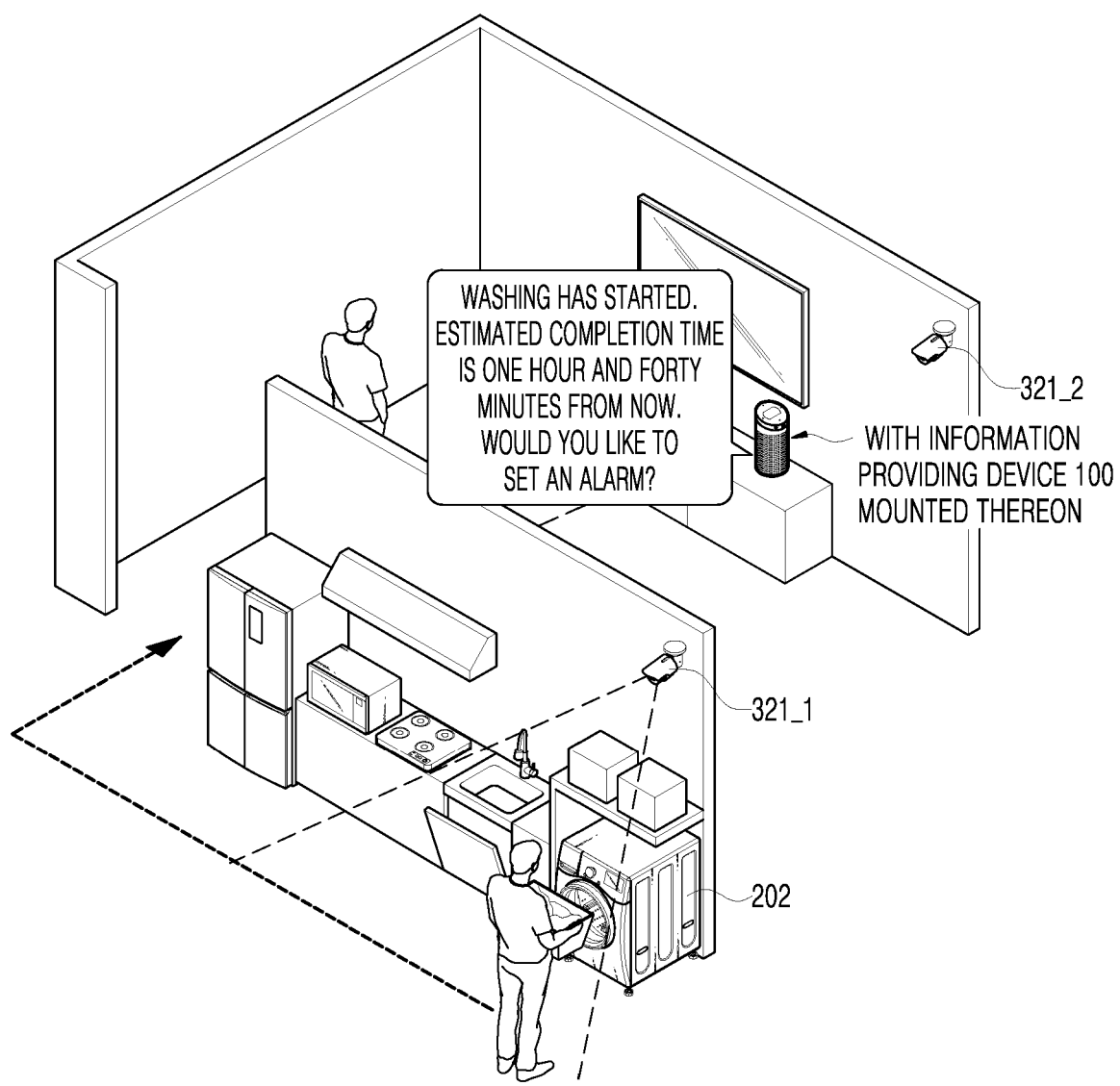
FIG. 6 illustrates an example in which the information providing device, having received situational information according to user behavioral analysis from an electronic device and a home monitoring device, initiates a conversation with a user, according to an embodiment of the present disclosure.
Figure 7:
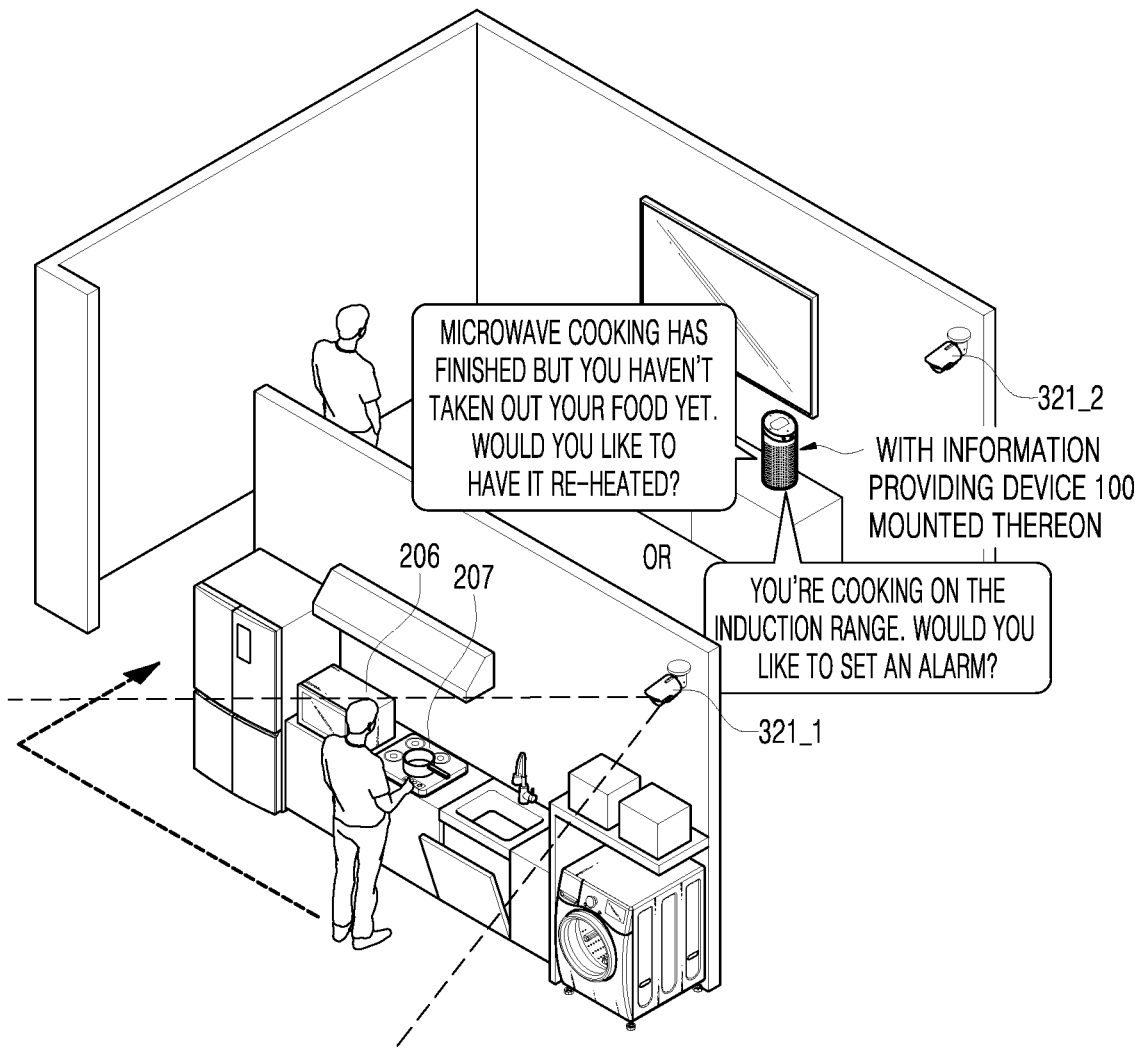
FIG. 7 illustrates an example in which the information providing device, having received situational information according to user behavioral analysis from an electronic device and a home monitoring device according to another embodiment of the present disclosure, initiates a conversation with a user.

The setter 165-1 may set a domain of the spoken sentence to be generated on the basis of the first situational information and the second situational information. The first situational information and the second situational information are information related to a manipulation of the first electronic device 200 through a manipulation of the first electronic device 200, and a spoken sentence generation domain may include a domain associated with the first electronic device 200. For example, as illustrated in FIG. 6, in a situation when the user operates the washing machine 202 by manipulating the washing machine 202, the domain of the spoken sentence to be generated may include domains related to clothes treatment and/or clothing. In addition, as illustrated in FIG. 7, in a situation when the user operates a microwave 206 and an induction range 207 by manipulating the microwave 206 and the induction range 207, the domain of the spoken sentence to be generated may include domains related to kitchen appliances and/or cooking or food.

The loader 165-2 may load a glossary associated with a domain of the spoken sentence to be generated on the basis of the first situational information and the second situational information. Here, depending on the processing capacity of the information providing device 100, the glossary may be loaded from the database 140 or may be loaded from the server 500 through the network 600. For example, as illustrated in FIG. 6, in a situation when the user manipulates the washing machine 202 to operate the washing machine 202, the loader 165-2 may load a glossary related to clothes treatment and/or clothing, and as illustrated in FIG. 7, in a situation when the user manipulates the microwave 206 and the induction range 207 to operate the microwave 206 and the induction range 207, the loader 165-2 may load a glossary related to kitchen appliances and/or cooking or food.

After gathering the third situational information from the home monitoring device 400, a spoken sentence generator 165-3 may extract and combine terms corresponding to the third situational information from the glossary to generate a spoken sentence.

The spoken sentence generator 165-3 may generate a spoken sentence containing at least one of current operation mode information, operation state information, or operation completion time information of the first electronic device 200, corresponding to the third situational information.

In some embodiments, after gathering the third situational information from the home monitoring device 400, the spoken sentence generator 165-3 may extract and combine terms corresponding to the third situational information from the glossary to generate a spoken sentence.

The processor 165-4 may generate a spoken suggestion sentence and include the same in the above-described spoken sentence, or may perform processing such that the spoken suggestion sentence becomes an independent spoken sentence. When the first electronic device 200 reaches an operation completion time, the processor 165-4 may generate a spoken suggestion sentence suggesting selecting a function of outputting alarm information, and include the spoken suggestion sentence in the spoken sentence. For example, FIG. 6 illustrates an example in which when the washing machine 202 has reached an operation completion time, the spoken suggestion sentence suggesting the function of outputting alarm information is included in the spoken sentence.

In addition, the processor 165-4 may generate a spoken suggestion sentence suggesting setting the operation mode of the first electronic device 200 interworking with the first electronic device 200, and include the spoken suggestion sentence in the spoken sentence, or may perform processing such that the spoken suggestion sentence becomes an independent spoken sentence. Here, the interworking may include a situation in which, while being able to communicate with each other through the same network 600, one first electronic device 200 has stored therein a control code of another electronic device 200 to be able to control the operation of the other electronic device 200. For example, while operating the washing machine 202 illustrated in FIG. 6, when the weather information indicates that it is raining, the processor 165-4 may generate a spoken suggestion sentence suggesting operating a dryer interworking with the washing machine 202, and include the spoken suggestion sentence in the spoken sentence.

The converter 166 may convert a spoken sentence generated for the purpose of initiating a conversation with the user and/or a spoken suggestion sentence to spoken utterance information and output the same. In the present embodiment, the converter 166 may be replaced with a text-to-speech (TTS) converter 168-4 of the speech recognizer 168.

After converting the spoken sentence to the spoken utterance information and outputting the same, the verifier 167 may verify the quality of the spoken sentence by monitoring reaction information of the user corresponding to the output spoken utterance information.

Here, the reaction information of the user may include reaction information of the user with regard to the spoken utterance information which the converter 166 has output. Such reaction information of the user may be expressed as a gesture and/or speech of the user, and may be acquired from the home monitoring device 400. In addition, the user reaction information may include positive reaction information in which satisfaction with regard to the spoken utterance information output from the converter 166 is expressed through a gesture and/or speech of the user, negative reaction information in which dissatisfaction with regard to the spoken utterance information output from the converter 166 is expressed through a gesture and/or speech of the user; and neutral reaction information in which neither satisfaction nor dissatisfaction with regard to the spoken utterance information output from the converter 166 is expressed through a gestures and/or speech of the user. The verifier 167 may accumulate and analyze the reaction information of the user, and may label the positive reaction information to extract positive reaction-inducing features, and perform positive reaction-labeling based learning to predict a satisfaction level and evolve; and with respect to the negative reaction information, may analyze the causes thereof and address the same.

After outputting the spoken utterance information, the speech recognizer 168 may receive feedback spoken utterance information of the user, perform speech recognition with respect to the feedback spoken utterance information, and output new spoken utterance information corresponding to a result of performing the speech recognition. In the present embodiment, the speech recognizer 168 may include an auto speech recognizer (ASR) 168-1, a natural language understanding processor 168-2, a natural language generator 168-3, and a text-to-speech (TTS) converter 168-4.

The ASR 168-1 may generate a feedback text item produced by converting the feedback spoken utterance of the user received through the audio input interface 131 to text. In the present embodiment, the ASR 168-1 may perform speech to text (STT) conversion. The ASR 168-1 may convert the received feedback spoken utterance information to the feedback text item. In the present embodiment, the ASR 168-1 may include an utterance recognizer. The utterance recognizer may include an acoustic model and a language model. For example, the acoustic model may include vocalization-related information, and the language model may include unit phoneme information and information about a combination of the unit phoneme information. The utterance recognizer may apply vocalization-related information and sound unit-related information to convert the feedback spoken utterance of the user to the feedback text item. Information about the acoustic model and language model may be stored, for example, an auto speech recognition database in the auto speech recognizer 168-1.

The natural language understanding processor 168-2 may learn an utterance intention of the feedback spoken utterance information by performing syntactic analysis or semantic analysis on the feedback text item. Here, the syntactic analysis may divide a query text into syntactic units (for example, words, phrases, and morphemes), and may recognize syntactic elements that the divided units have. In addition, the semantic analysis can be performed using, for example, semantic matching, rule matching, and formula matching. Accordingly, the natural language understanding processor 168-2 may learn what intent is the feedback text item, or may acquire parameters required for expressing such intent.

The natural language generator 168-3 may generate a new response text item with respect to the feedback text item by using a knowledge base based on the utterance intention analyzed by the natural language understanding processor 168-2.

The TTS converter 168-4 may generate the new spoken utterance information in the form of natural language speech, as a result of converting the new response text item to speech, and may have the new spoken utterance information output through the audio output interface 132.

Accordingly, based on the situational information of the user, it is possible to predict a user's input and prepare the speech recognition in response to the same, to improve speech recognition accuracy and processing speed.

Figure 5:
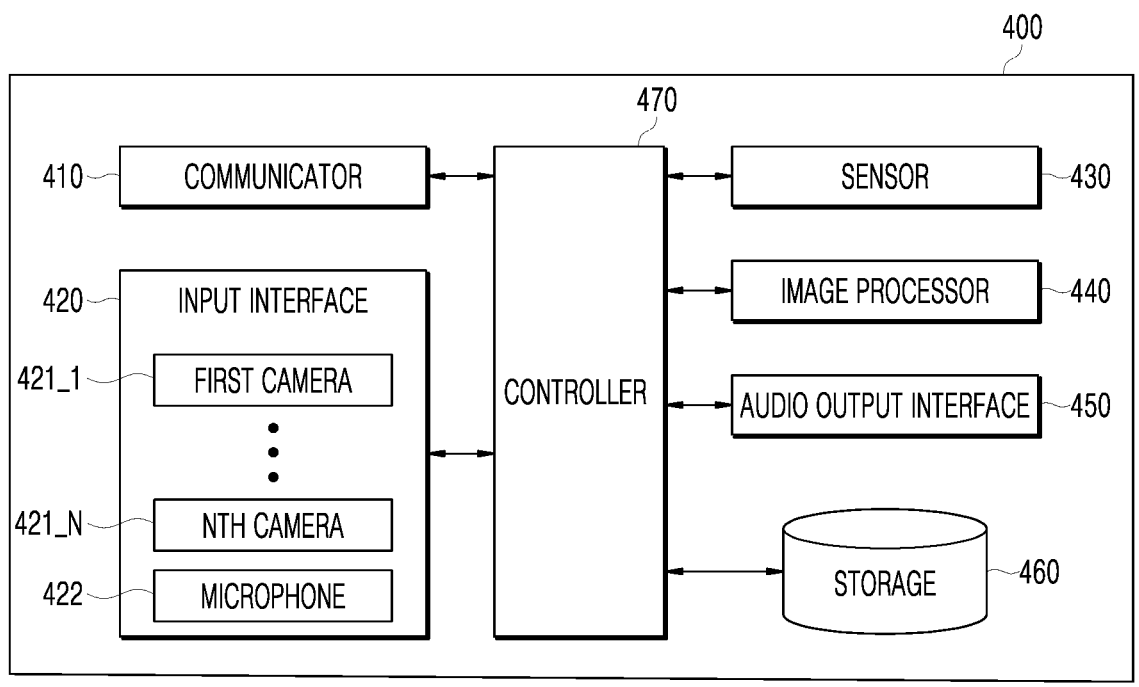
FIG. 5 is a diagram schematically illustrating the detailed configuration of a home monitoring device in the information providing environment in FIG. 1 according to an embodiment of the present disclosure.

FIG. 5 is a diagram schematically illustrating the detailed configuration of the home monitoring device in the information providing environment in FIG. 1. Hereinbelow, a description of the common part previously described with reference to FIG. 1 to FIG. 4 will be omitted. Referring to FIG. 5, the home monitoring device 400 may include a communicator 410, an input interface 420, a sensor 430, an image processor 440, an audio output interface 450, a storage 460, and a controller 470.

The communicator 410 may interwork with the network 600 to provide a communication interface required to provide transmission/reception signals between the information providing device 100, the first electronic device 200, the second electronic device 300, and/or the server 500, in the form of packet data. In addition, the communicator 410 may support various kinds of object-to-object intelligent communication (such as Internet of things (IoT), Internet of everything (IoE), and Internet of small things (IoST)), and may support communication such as machine to machine (M2M) communication, vehicle to everything communication (V2X), and device to device (D2D) communication.

The input interface 420 may include a camera 421 for receiving input of image signals and a microphone 422 for receiving input of audio signals. The camera 421 may include a first camera 421_1 to an Nth camera 421-N. Under control of the controller 470, the camera 421 may photograph an image of the user manipulating the first electronic device 200, an image of the user moving after manipulating the first electronic device 200, and an image of the user after the information providing device 100 outputs a spoken utterance for generating reaction information of the user. The camera 421 may refer to a camera for photographing a subject in a photographing area using a complementary metal-oxide semiconductor (COMS) module or a charge coupled device (CCD) module. An input image frame may be provided as a COMS module or a CCD module via a lens, and the COMS module or the CCD module can convert an optical signal of a subject that has passed through the lens into an electrical signal, and output the electrical signal. In addition, the camera 421 may be a PTZ camera having a pan/tilt/zoom function. The camera 421 may photograph a still video and also a moving video including frames composed of the still video. Further, the image photographed and acquired by the camera 421 may be stored in the storage 460.

The microphone 422, under control of the controller 470, may receive feedback spoken utterance information of the user being uttered toward the information providing device 100, the first electronic device 200, the second electronic device 300, and/or the home monitoring device 400, and spoken utterance information of the user after the information providing device 100 outputs the spoken utterance for generating the reaction information of the user. In addition, there may be provided a plurality of microphones 422 for more accurately receiving the feedback spoken utterance information of the user and/or the spoken utterance information of the user. Here, the plurality of microphones may be disposed in different locations, spaced apart from each other, and may process the received feedback spoken utterance information of the user and/or spoken utterance information of the user into electric signals. In some embodiments, the input interface 420 may use various noise removal algorithms in order to remove noise generated in the process of receiving feedback spoken utterance information of the user and/or spoken utterance information of the user. In some embodiments, the speech input interface 420 may include various components for processing speech signals, such as a filter for removing the noise upon receiving feedback spoken utterance information of the user and/or spoken utterance information of the user, and an amplifier for amplifying signals output from the filter and outputting the amplified signals.

The sensor 430 may include one or more sensors for sensing at least one among environment information surrounding the home monitoring device 400 and user information. For example, the sensor 430 may include at least one among an obstacle detection sensor (for example, a proximity sensor or a Light Detection And Ranging (lidar) sensor), a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a fingerprint recognition sensor, an ultrasonic sensor, an optical sensor (for example, the camera 121), a microphone (for example, the microphone 422), an environmental sensor (for example, a barometer, a hygrometer, a thermometer, a radioactivity detection sensor, a heat detection sensor, or a gas detection sensor), and a chemical sensor (for example, an electronic nose, a healthcare sensor, or a biometric sensor).

From image information photographed by the camera 421, the image processor 440 may perform recognition and processing of an image for generating first user event information, first situational information, second user event information, third situational information, and reaction information of the user. The image processor 440 may be provided inside the camera 421 or may be provided outside the camera 421, as illustrated in FIG. 5.

The image processor 440 may reduce noise for a photographed image frame photographed by the camera 421 and may perform image signal processing operations for image quality improvement, such as gamma correction, color filter array interpolation, color matrix, color correction, and color enhancement. Further, the image processor 440 may perform functions such as a coloring process, a blurring process, an edge emphasizing process, an image analysis process, an image recognition, and an image effect process. Facial recognition, scene recognition, motion recognition, and the like may be performed for the image recognition. For example, brightness level adjustment, color correction, contrast adjustment, contour enhancement adjustment, screen division processing, character image generation, and image synthesis processing may be performed.

The audio output interface 450 may output information associated with the operation of the home monitoring device 400 as audio data, and under control of the controller 470, may output notification messages such as alarm sounds, operation mode, operation state, and error states, as audio. The audio output interface 450 may convert an electrical signal received from the controller 470 into an audio signal. For this purpose, the audio output interface 142 may include, for example, a speaker.

The storage 460 may store data supporting various functions of the home monitoring device 400. The storage 460 may store a plurality of application programs or applications that are operated by the home monitoring device 400, data for operating the home monitoring device 400, and instructions. At least some of the application programs may be downloaded via an external server through wireless communication. In the present embodiment, the storage 460 may store, for example, image information photographed by the camera 421, audio signals received by the microphone 422, sensing signals sensed by the sensor 430, the first user event information, the first situational information, the second user event information, the third situational information, and the reaction information of the user generated by the image processor 440, and the audio signals output by the audio output interface 450.

In the present embodiment, the storage 460 may temporarily or permanently store data processed by the controller 470. Here, the storage 460 may include magnetic storage media or flash storage media, but the present disclosure is not limited thereto. This storage 460 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The controller 470 may control the entire operation of the laundry home monitoring 400 by operating control software installed in the memory 460 as a kind of central processing device. In the present embodiment, the controller 470 may determine the operation mode of the home monitoring device 400, and when the first user event information occurs, transmit the first situational information to the information providing device 100, and when the second user event information occurs, transmit the third situational information to the information providing device 100, and may transmit the reaction information of the user to the information providing device 100 by request of the information providing device 100.

Herein, the controller 470 may include all kinds of devices capable of processing data, such as a processor. Here, 'the processor' may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

FIG. 6 illustrates an example in which the information providing device, having received situational information according to user behavioral analysis from an electronic device and a home monitoring device, initiates a conversation with a user. Hereinafter, description of common parts previously described with reference to FIGS. 1 to 5 will be omitted.

FIG. 6 illustrates an example of a situation in which, when the user has manipulated the washing machine 202 and relocated, even without receiving a wake-up word from the user, the second electronic device 300 mounted on the information providing device 100 initiates a conversation with the user.

In response to an occurrence of the first user event information, the first camera 421_1 may photograph an image of the user and generate the first situational information, and transmit the same to the second electronic device 300 in which the information providing device 100 is mounted. Subsequently, the second electronic device 300 in which the information providing device 100 is mounted may request the washing machine 202 for transmission of the second situational information and may receive the second situational information from the washing machine 202. In response to an occurrence of the second user event information, the first camera 421_1 and/or the second camera 421_2 may photograph an image of the user and generate the third situational information, and transmit the same to the second electronic device 300 in which the information providing device 100 is mounted.

The second electronic device 300 with the information providing device 100 mounted thereon may use the first situational information to the third situational information to generate a spoken sentence, and may convert the spoken sentence to the spoken utterance information and output the same for the purpose of initiating a conversation with the user. In one embodiment, the spoken utterance information which the second electronic device 300 with the information providing device 100 mounted thereon outputs may include "Washing has started. Estimated completion time is one hour and forty minutes from now. Would you like to set an alarm?".

Upon receiving feedback spoken utterance of the user with respect to the output spoken utterance information, the second electronic device 300 with the information providing device 100 mounted thereon may execute the processing according to a user command contained in the feedback spoken utterance of the user. In one embodiment, when the feedback spoken utterance information of the user is, for example, "Please set an alarm," the second electronic device 300 with the information providing device 100 mounted thereon may notify the user that the washing machine has completed the washing through an alarm after one hour and thirty minutes.

FIG. 7 illustrates an example in which the information providing device, having received situational information according to user behavioral analysis from an electronic device and a home monitoring device according to another embodiment of the present disclosure, initiates a conversation with a user. Hereinafter, description of common parts previously described with reference to FIGS. 1 to 6 will be omitted.

FIG. 7 illustrates an example of a situation in which, when the user has manipulated the microwave 206 and the induction range 207 and relocated, even without receiving a wake-up word from the user, the second electronic device 300 mounted on the information providing device 100 initiates a conversation with the user. Hereinafter, since FIG. 7 is similar to FIG. 6, detailed description of FIG. 7 will be omitted.

Figure 8:
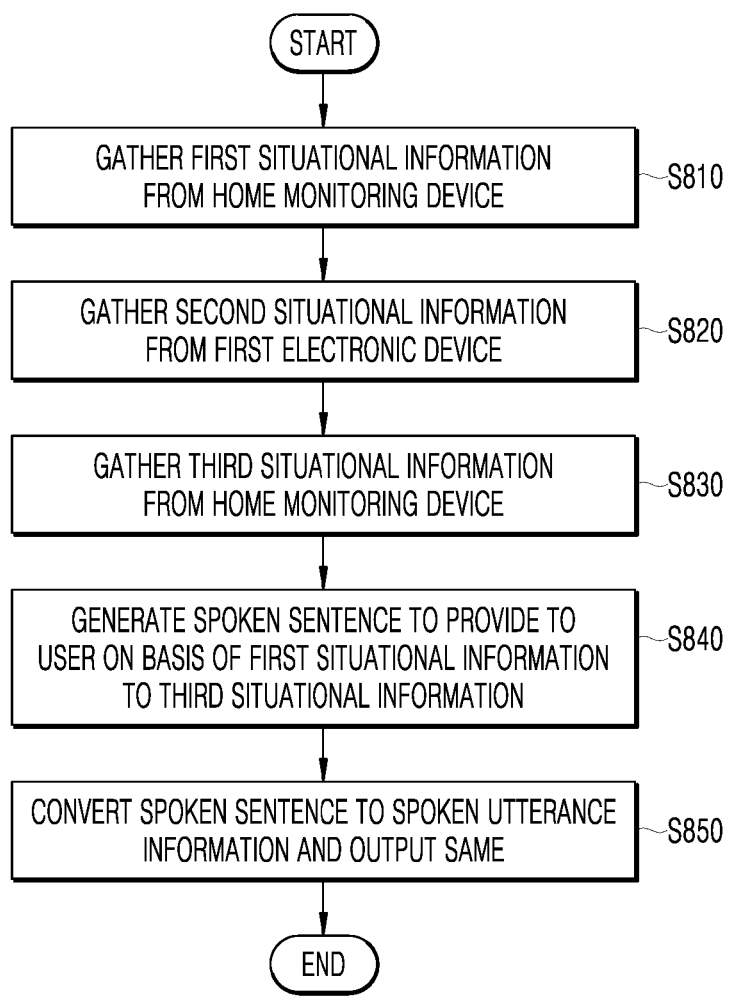
FIG. 8 is a flowchart illustrating an information providing method according to an embodiment of the present disclosure.

FIG. 8 is a flowchart illustrating an information providing method according to an embodiment of the present disclosure. In the following description, repeated description of common parts previously described with reference to FIG. 1 to FIG. 7 will be omitted.

Referring to FIG. 8, in step S810, the information providing device 100 gathers first situational information from the home monitoring device 400. Here, the first situational information is information of the user manipulating the first electronic device 200, and may contain information related to the type of the first electronic device 200 that the user is manipulating, what manipulation the user is performing with respect to the first electronic device 200, and the time of the manipulation of the first electronic device 200.

In step S820, the information providing device 100 gathers, from the first electronic device 200, second situational information corresponding to the acquisition of the first situational information.

After gathering the first situational information, the information providing device 100 may request the first electronic device 200 for transmission of the second situational information, and may gather the second situational information from the first electronic device 200. Here, the second situational information is information generated by a user's manipulation signal which the first electronic device 200 has received, and may contain at least one of operation mode information and operation completion time information of the first electronic device 200. The information providing device 100, having gathered the second situational information, may use time information of manipulating the first electronic device 200 contained in the first situational information, and the operation completion time information of the first electronic device 200, to calculate end time information at which the first electronic device 200 finishes an operation, and may include the end time information for the first electronic device 200 finishing the operation in the second situational information.

In step S830, the information providing device 100 gathers third situational information from the home monitoring device 400 after gathering the first situational information.

Here, the third situational information is information containing a behavioral change of the user after gathering the first situational information, and may contain information associated with a situation in which the user relocates from a space in which the first electronic device 200 is disposed to a space in which the second electronic device 300 is disposed. The third situational information may contain information associated with the direction in which the user is moving, the presence of another camera capable of monitoring the behavior of the user in the direction in which the user is moving, and time information for when the user exceeds a predetermined distance (for example, one meter) from the first electronic device 200. In some embodiments, the information providing device 100 may request a weather information providing device providing weather information for weather information corresponding to time information associated with occurrences of the first event information to the third event information, and gather the weather information.

In step S840, upon gathering the first situational information to the third situational information from the first electronic device 200 and the home monitoring device 400, the information providing device 100 generates a spoken sentence to provide to the user on the basis of the first situational information to the third situational information.

By using a deep neural network model previously trained to generate the spoken sentence by analyzing manipulation information of a user manipulating the first electronic device 200, and operation mode and operation completion time information of the first electronic device 200, the information providing device 100 may analyze the first situational information and the second situational information to generate a spoken sentence to be output from the second electronic device 300. In some embodiments, the information providing device 100 may set the domain of a spoken sentence to be generated on the basis of the first situational information and the second situational information, load a glossary associated with the domain of the spoken sentence to be generated on the basis of the first situational information and the second situational information, and once the third situational information is gathered, extract and combine terms corresponding to the third situational information from the glossary to generate a spoken sentence. In some embodiments, after having gathered the first situational information to the third situational information from the first electronic device 200 and the home monitoring device 400, and weather information from a weather information providing device, the information providing device 100 generates a spoken sentence to provide to the user on the basis of the first situational information to the third situational information and the weather information.

In step S840, once the spoken sentence is generated, the information providing device 100 converts the spoken sentence to spoken utterance information and outputs the same for the purpose of initiating a conversation with the user.

In some embodiments, after converting the spoken sentence to the spoken utterance information, the information providing device 100 may verify the quality of the spoken sentence by monitoring reaction information of the user corresponding to the output spoken utterance information.

In some embodiments, after outputting the spoken utterance information, the information providing device 100 receives feedback spoken utterance information of the user, performs speech recognition with respect to the feedback spoken utterance information, and outputs new spoken utterance information corresponding to a result of performing the speech recognition, thereby enabling smooth continuation of the conversation with the user.

The example embodiments described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. An information providing method, comprising:
    gathering first situational information from a home monitoring device, the first situational information containing user manipulation information of a first electronic device manipulated by a user;
    gathering, from the first electronic device manipulated by the user, second situational information corresponding to the first situational information, the second situational information containing at least one of operation mode information of the first electronic device or operation completion time information of the first electronic device;
    gathering, from the home monitoring device, third situational information containing a behavioral change of the user after the gathering the first situational information;
    generating a spoken sentence to provide to the user based on the first situational information, the second situational information and the third situational information; and
    converting the spoken sentence to spoken utterance information to be output to the user,
    wherein the generating the spoken sentence comprises:
        setting a domain of the spoken sentence to be generated based on the first situational information and the second situational information;
        loading a glossary associated with the domain of the spoken sentence based on the first situational information, the second situation information and the third situational information; and
        after the third situational information is gathered, extracting and combining terms corresponding to the third situational information from the glossary to generate the spoken sentence.

2. The information providing method of claim 1, wherein the first situational information, the second situational information and the third situational information are gathered without the home monitoring device receiving any type of wake word from the user, and
    wherein the generating the spoken sentence and the converting the spoken sentence to the spoken utterance information are performed without the home monitoring device receiving any type of wake word from the user.

3. The information providing method of claim 1, further comprising:
    gathering weather information corresponding to time information associated with occurrence of the first situational information, the second situational information and the third situational information,
    wherein the generating the spoken sentence comprises extracting and combining terms corresponding to the third situational information and the weather information from the glossary to generate the spoken sentence after the third situational information is gathered.

4. The information providing method of claim 1, wherein the spoken sentence comprises at least one of operation mode information, operation state information, or operation completion time information of the first electronic device, and
    wherein the generating the spoken sentence comprises generating a spoken suggestion sentence suggesting selecting a function of outputting alarm information when the first electronic device reaches the operation completion time information.

5. The information providing method of claim 1, wherein the generating the spoken sentence comprises generating a spoken suggestion sentence suggesting setting an operation mode of another electronic device interworking with the first electronic device.

6. The information providing method of claim 1, further comprising:
    after converting the spoken sentence to the spoken utterance information to be output, verifying a quality of the spoken sentence by monitoring reaction information of the user corresponding to the output spoken utterance information.

7. The information providing method of claim 6, wherein the verifying the quality of the spoken sentence includes:
    verifying the quality of the spoken sentence by monitoring the reaction information of the user from at least one of image information of the user or speech information of the user, and
    wherein after outputting the spoken utterance information, the image information is obtained using a camera provided in the home monitoring device within a predetermined time, and an audio information is obtained using a microphone provided in the home monitoring device within the predetermined time.

8. The information providing method of claim 1, further comprising:
    after outputting the spoken utterance information, receiving feedback spoken utterance information of the user;
    performing speech recognition with respect to the feedback spoken utterance information; and
    outputting new spoken utterance information corresponding to a result of performing the speech recognition,
    wherein the performing the speech recognition with respect to the feedback spoken utterance information comprises:
        generating a feedback text item produced by converting the feedback spoken utterance information to text;
        learning an utterance intention of the feedback spoken utterance information by performing syntactic analysis or semantic analysis on the feedback text item;
        generating a response text item based on a knowledge base corresponding to the utterance intention; and
        converting the response text item to the new spoken utterance information in a form of natural language speech.

9. An information providing device, comprising:
    a first acquirer configured to gather first situational information from a home monitoring device, the first situational information containing user manipulation information of a first electronic device manipulated by a user;
    a second acquirer configured to gather, from the first electronic device manipulated by the user, second situational information corresponding to the first situational information, the second situational information containing at least one of operation mode information of the first electronic device or operation completion time information of the first electronic device;
    a third acquirer configured to gather, from the home monitoring device, third situational information containing a behavioral change of the user after gathering the first situational information;
    a generator configured to generate a spoken sentence to provide to the user based on the first situational information, second situational information and the third situational information; and
    a converter configured to convert the spoken sentence to spoken utterance information to be output to the user, wherein the generator comprises:
        a setter configured to set a domain of the spoken sentence to be generated based on the first situational information and the second situational information;
        a loader configured to load a glossary associated with the domain of the spoken sentence based on the first situational information and the second situational information; and
        a spoken sentence generator configured to generate, after the third situational information is gathered, the spoken sentence by extracting and combining terms corresponding to the third situational information from the glossary.

10. The information providing device of claim 9, wherein the first situational information, the second situational information and the third situational information are gathered without the home monitoring device receiving any type of wake word from the user, and
    wherein the spoken sentence is generated by the generator and the spoken sentence is converted to the spoken utterance information by the convertor without the home monitoring device receiving any type of wake word from the user.

11. The information providing device of claim 9, further comprising:
    a third acquirer configured to gather weather information corresponding to time information associated with occurrence of the first situational information, the second situational information and the third situational information,
    wherein the generator is configured to generate the spoken sentence, after the third situational information is gathered, by extracting and combining the terms corresponding to the third situational information and the weather information from the glossary.

12. The information providing device of claim 9, wherein the third situational information contains information associated with the user relocating from a space including the first electronic device to a space including a second electronic device capable of audio output,
    wherein the generator is configured to generate the spoken sentence to be output from the second electronic device by analyzing the first situational information and the second situational information using a deep neural network model, the deep neural network model being previously trained to generate the spoken sentence by analyzing manipulation information of the user manipulating the first electronic device, and operation mode and operation completion time information of the first electronic device, and
    wherein the information providing device further comprises a communicator configured to transmit the spoken utterance information to the second electronic device.

13. The information providing device of claim 9, wherein the spoken sentence contains at least one of operation mode information, operation state information, or operation completion time information of the first electronic device, and
    wherein the generator further comprises a processor configured to generate a spoken suggestion sentence suggesting selecting a function of outputting alarm information when the first electronic device reaches the operation completion time information.

14. The information providing device of claim 9, wherein the generator further comprises a processor configured to generate a spoken suggestion sentence suggesting setting an operation mode of another electronic device interworking with the first electronic device.

15. The information providing device of claim 9, further comprising:
    a verifier configured to, after converting the spoken sentence to the spoken utterance information to be output, verify a quality of the spoken sentence by monitoring reaction information of the user corresponding to the output spoken utterance information.

16. The information providing device of claim 15, wherein the verifier is configured to verify the quality of the spoken sentence by monitoring the reaction information of the user from at least one of image information of the user or audio information of the user, and
    wherein after outputting the spoken utterance information, the image information is obtained using a camera provided in the home monitoring device within a predetermined time, and an audio information is obtained using a microphone provided in the home monitoring device within the predetermined time.

17. The information providing device of claim 9, further comprising:
    a speech recognizer configured to:
        receive feedback spoken utterance information of the user after outputting the spoken utterance information,
        perform speech recognition with respect to the feedback spoken utterance information, and
        output new spoken utterance information corresponding to a result of performing the speech recognition,
    wherein the speech recognizer is configured to:
        generate a feedback text item produced by converting the feedback spoken utterance information to text, learn an utterance intention of the feedback spoken utterance information by performing syntactic analysis or semantic analysis on the feedback text item, generate a response text item based on a knowledge base corresponding to the utterance intention, and convert the response text item to the new spoken utterance information in the form of natural language speech to be output.

18. An information providing method, comprising:
gathering first situational information from a home monitoring device, the first situational information containing user manipulation information of a first electronic device manipulated by a user;
gathering, from the first electronic device manipulated by the user, second situational information corresponding to the first situational information, the second situational information containing at least one of operation mode information of the first electronic device or operation completion time information of the first electronic device;
gathering, from the home monitoring device, third situational information containing a behavioral change of the user after the gathering the first situational information;
generating a spoken sentence to provide to the user based on the first situational information, the second situational information and the third situational information; and converting the spoken sentence to spoken utterance information to be output to the user, wherein the third situational information contains information associated with the user relocating from a space including the first electronic device to a space including a second electronic device capable of audio output, wherein the generating the spoken sentence comprises, by using a deep neural network model, analyzing the first situational information and the second situational information to generate the spoken sentence to be output from the second electronic device, the deep neural network being previously trained to generate the spoken sentence by analyzing manipulation information of the user manipulating the first electronic device, and the operation mode and operation completion time information of the first electronic device, and wherein the converting the spoken sentence to the spoken utterance information to be output includes transmitting the spoken utterance information to the second electronic device.

* * * * *